(12) United States Patent
Lagnado et al.

(10) Patent No.: US 12,130,685 B2
(45) Date of Patent: Oct. 29, 2024

(54) PARTIAL WAKE STATES

(71) Applicant: Hewlett-Packard Development Company, L.P., Spring, TX (US)

(72) Inventors: Isaac Lagnado, Spring, TX (US); Christopher Charles Mohrman, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/042,592

(22) PCT Filed: Oct. 23, 2020

(86) PCT No.: PCT/US2020/056974
§ 371 (c)(1),
(2) Date: Feb. 22, 2023

(87) PCT Pub. No.: WO2022/086544
PCT Pub. Date: Apr. 28, 2022

(65) Prior Publication Data
US 2023/0341918 A1 Oct. 26, 2023

(51) Int. Cl.
*G06F 1/00* (2006.01)
*G06F 1/3209* (2019.01)
*G06F 1/3234* (2019.01)

(52) U.S. Cl.
CPC .......... *G06F 1/3209* (2013.01); *G06F 1/3278* (2013.01)

(58) Field of Classification Search
CPC .... G06F 1/3209; G06F 1/3278; G06F 9/4893; Y02D 10/00
See application file for complete search history.

(56) References Cited

U.S. PATENT DOCUMENTS

| | | | |
|---|---|---|---|
| 5,689,715 A | 11/1997 | Crump et al. | |
| 5,954,819 A | 9/1999 | Kenny et al. | |
| 5,983,356 A * | 11/1999 | Pandey | G06F 1/04 713/320 |
| 8,077,015 B1 | 12/2011 | Kammer et al. | |
| 8,467,837 B2 | 6/2013 | Matson et al. | |
| 9,170,632 B2 | 10/2015 | Brooks et al. | |
| 9,182,808 B1 * | 11/2015 | Jones | G06F 1/3209 |
| 9,710,286 B2 | 7/2017 | Liao et al. | |
| 2005/0216757 A1 | 9/2005 | Gardner | |
| 2011/0134251 A1 * | 6/2011 | Kim | G06F 1/325 348/E5.09 |
| 2013/0099757 A1 * | 4/2013 | Ham | H02J 7/0047 320/155 |
| 2014/0129860 A1 * | 5/2014 | Rosenthal | G06F 1/3209 713/323 |
| 2014/0380075 A1 * | 12/2014 | Pulapaka | G06F 1/3206 713/323 |

(Continued)

*Primary Examiner* — Xuxing Chen
(74) *Attorney, Agent, or Firm* — Knobbe, Martens, Olson & Bear, LLP

(57) ABSTRACT

An electronic device includes a communication device to receive a command from another electronic device while the electronic device is in a power saving state, where the command is different from a wake command; and a processor to transition the electronic device from the power saving state to: a partial wake state when the command indicates a first operation; and a full wake state when the command indicates a second operation.

13 Claims, 4 Drawing Sheets

(56) References Cited

U.S. PATENT DOCUMENTS

| | | | |
|---|---|---|---|
| 2015/0212573 A1* | 7/2015 | Bradford | G06F 1/3284 |
| | | | 713/323 |
| 2016/0124493 A1* | 5/2016 | Liao | G06F 1/3209 |
| | | | 713/310 |
| 2016/0124495 A1 | 5/2016 | Kim et al. | |
| 2016/0132098 A1* | 5/2016 | Chen | G06F 1/3234 |
| | | | 713/323 |
| 2017/0308154 A1 | 10/2017 | Young et al. | |
| 2018/0317019 A1* | 11/2018 | Fürst | H04R 3/00 |
| 2019/0227783 A1* | 7/2019 | Chang | G06F 21/64 |
| 2022/0060623 A1* | 2/2022 | Elizov | G06F 3/017 |

* cited by examiner

PARTIAL WAKE STATES

BACKGROUND

An electronic device, such as a laptop computer, a tablet computer, a smart phone, etc. may perform power management related operations by implementing the Advanced Configuration and Power Interface (ACPI) specification.

BRIEF DESCRIPTION OF THE DRAWINGS

Some examples of the present application are described with respect to the following figures.

DETAILED DESCRIPTION

Figure 1:
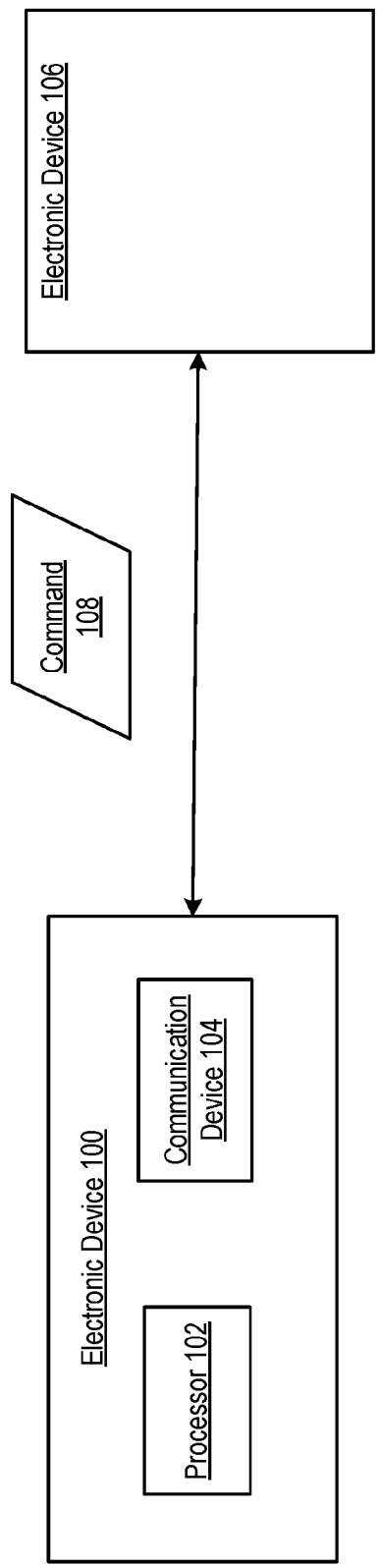
FIG. 1 illustrates an electronic device to transition from a power saving state to a partial wake state based on a command, according to an example.

When an electronic device implements the Advanced Configuration and Power Interface (ACPI) specification to control a power state of the electronic device, the electronic device may transition from a soft off state (e.g., the S5 state) to a working state (e.g., the S0 state) in response to a wake command. When the electronic device is transitioning to the working state, all components of the electronic device may be powered on. However, there are situations where the electronic device may be awakened to perform a simple operation (e.g., providing a status update to a server) where only some of the components of the electronic device are needed to perform the operation. Thus, the power consumed by the components that are powered on but stay idle may be wasted. Examples described herein provide an approach to enable an electronic device to transition from a power saving state to a partial wake state where processing resources needed to perform an operation are awakened while the other processing resources remain in the power saving state.

In an example, an electronic device may include a communication device to receive a command from another electronic device while the electronic device is in a power saving state, where the command is different from a wake command; and a processor to transition the electronic device from the power saving state to: a partial wake state when the command indicates a first operation; and a full wake state when the command indicates a second operation.

In another example, an electronic device may include a plurality of processing resources; a communication device to receive a command from another electronic device while the plurality of processing resources is inactive, where the command is different from a wake command; and a processor to: transition a first set of the plurality of processing resources from inactive to active when the command indicates a first operation; and transition a second set of the plurality of processing resources from inactive to active when the command indicates a second operation, where the second set has a larger number of the processing resources than the first set.

In another example, a non-transitory computer-readable storage medium may include instructions that when executed cause a processor of an electronic device to: receive a command from another electronic device, wherein the command is different from a wake command; and transition a set of processing resources of the electronic device from inactive to active based on the command, where the set of processing resources includes a first subset of processing resources to carry out the command and a second subset of processing resources to authenticate the command. Thus, examples described herein may enable an electronic device to transition from a power saving state to a partial wake state based on a command, where processing resources not needed to carry out the command remain in the power saving state to more efficiently consume power.

Turning to FIG. 1, FIG. 1 illustrates an electronic device 100 to transition from a power saving state to a partial wake state based on a command, according to an example. Electronic device 100 may be, for example, a notebook computer, a desktop computer, an all-in-one system, a tablet computing device, a mobile phone, an electronic book reader, a wearable computing device (e.g., a smart watch), etc.

Electronic device 100 may include a processor 102 and a communication device 106. Electronic device 100 may manage power consumption of electronic device 100 by operating in a plurality of power states. For example, electronic device 100 may have a power saving state, a partial wake state, and a full wake state. Each of the plurality of power states may be defined based on a power consumption range in the particular power state, the amount or number of processing resources running (i.e., powered on), or a combination thereof. As used herein, a processing resource means a component of electronic device 100 that contributes to the overall functionality of electronic device or performs a particular function within electronic device. A processing resource may be a hardware electronic component, a circuit, or a combination thereof. Processor 102 and communication device 106 may be processing resources of electronic device 100. As described in more detail in FIG. 2, electronic device 100 may include a plurality of additional processing resources.

As an example, electronic device 100 may have a distinct power consumption range in each of the plurality of power states. Electronic device 100 may have the lowest power consumption range in the power saving state and the highest power consumption range in the full wake state. The power consumption range of the partial wake state may be greater than the power consumption range in the power saving state but less than the power consumption range in the full wake state. The power range may be an average power consumption range of electronic device 100 or an instantons power consumption range of electronic device 100. In some examples, electronic device 100 may implement the sleeping state (i.e., the S0ix state, the S1 state, the S2 state, the S3 state, and the S4 state) under the ACPI specification as the power saving state. In some examples, electronic device 100 may implement the soft off state (i.e., the S5 state) as the power saving state. In some examples, electronic device 100 may implement the working state (i.e., the S0 state) as the full wake state.

As another example, electronic device 100 may have the least amount of processing resources running in the power saving state and may have the most amount of processing resources running in the full wake state. The amount of processing resources of electronic device 100 running in the partial wake state may be greater than the amount of processing resources running in the power saving state but less than the amount of processing resources running in the full wake state.

As another example, electronic device 100 may have a first power consumption range and a first amount of processing resources running in the power saving state. Electronic device 100 may have a second power consumption range and a second amount of processing resources running in the partial wake state. Electronic device 100 may have a third power consumption range and a third amount of processing resources running in the full wake state. The first power consumption range may be the lower than the second power consumption range. The second power consumption range may be lower than the third power consumption range. The first amount may be less than the second amount. The second amount may be less than the third amount.

During operation, electronic device 100 may be operating in the full wake state. Electronic device 100 may transition from the full wake state to a power saving state in response to a trigger. The trigger may be an inactivity threshold, low battery capacity, etc. While electronic device 100 is in the power saving state, processor 102 and communication device 106 may be active while other processing resources of electronic device 100 may be inactive. As used herein, a processing resource is active means the processing resource is powered on. As used herein, a processing resource is inactive means the processing resource is powered off.

An electronic device 104 may transmit a command 108 to electronic device 100. Command 108 may be different than a wake command. That is, command 108 may not be a wake command. For example, a wake command may be a Wake-On-Lan magic packet. Command 108 may have a different payload than the magic packet.

Processor 102 may receive command 108 via communication device 106. Processor 102 may determine that command 108 indicates that a first operation to be performed at electronic device 100. In response to the determination that the first operation is to be performed, processor 102 may determine a set processing resources needed to carry out command 108 (i.e., the first operation) and may transition electronic device to a partial wake state by waking up the set of processing resources. As described in more detail in FIG. 2, electronic device 100 may have a plurality of partial wake states. Each partial wake state may have a distinct set of processing resources that transition from inactive to active based on the particular command received. In some examples, in response to completing the first operation indicated by command 108, processor 102 may transition the set of processing resources back to inactive, thus placing electronic device 100 back to the power saving state.

Figure 2:
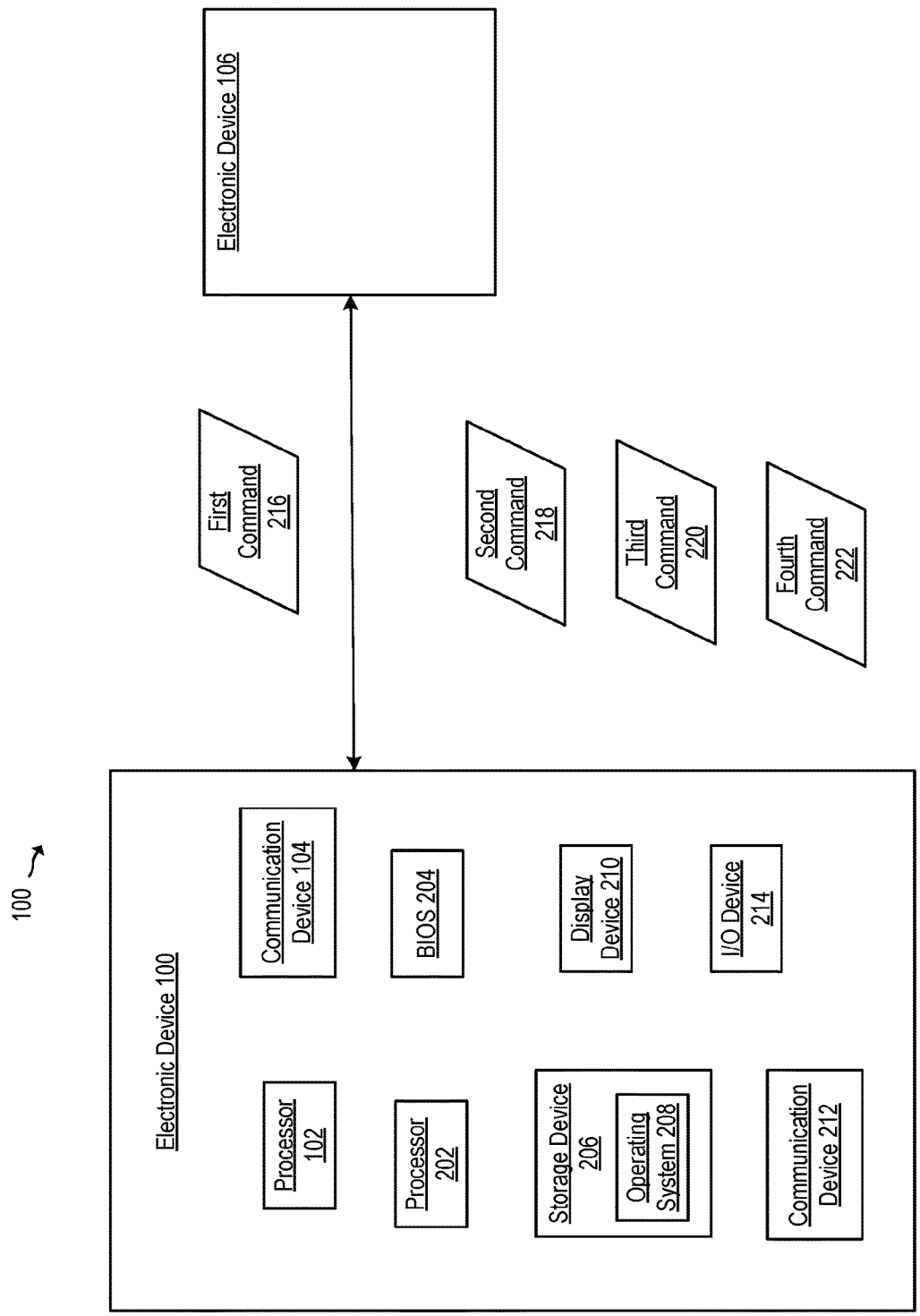
FIG. 2 illustrates an electronic device to transition from a power saving state to a partial wake state based on a command, according to another example.

FIG. 2 illustrates electronic device 100 to transition from a power saving state to a partial wake state based on a command, according to another example. In addition to processor 102 and communication device 106, electronic device 100 may also include a plurality of processing resources, such as a processor 202, a basic input/output system (BIOS) 204, a storage device 206, an operating system 208 stored in storage device 206, a display device 210, a communication device 212, and an input/output (I/O) device.

During operation, electronic device 104 may broadcast a first command 216. Electronic device 100 may be in the power saving state. Processor 102 and communication device 106 may be active while the plurality of processing resources may be inactive.

Processor 102 may receive first command 216 via communication device 106. Processor 102 may examine first command 216 to determine that first command 216 indicates a first operation is to be performed at electronic device 100. Processor 102 may determine a first set of processing resources of the plurality of processing resources to carry out the first operation. In some examples, the first operation may be a BIOS upgrade operation and the first set of processing resources may include processor 202, BIOS 204, and communication device 212. Thus, processor 102 may transition electronic device 100 to a first partial wake state by transitioning processor 202, BIOS 204, and communication device 212 from inactive to active. When active, BIOS 204 may communicate with a server (not shown in the FIGS.) to download an upgrade packet via communication device 212. Once the upgrade operation is completed, processor 102 may transition electronic device back to the power saving state by transitioning processor 202, BIOS 204, and communication device 212 from active to inactive.

In some examples, electronic device 104 may broadcast a second command 218 and processor 102 may receive second command 218 via communication device 106. Processor 102 may determine that second command 218 indicates a second operation is to be performed at electronic device 100. Processor 102 may determine a second set of processing resources of the plurality of processing resources to carry out the second operation. The second set of processing resources may be different than the first set of processing resources. The second set of processing resources may be larger than the first set of processing resources. For example, the second operation may be an operation to reset operating system 208. Processor 102 may transition electronic device 100 from the power saving state to a second partial wake state by transitioning BIOS 204, storage device 206, processor 202, and operating system 208 from inactive to active.

In some examples, electronic device 104 may broadcast a third command 220 and processor 102 may receive third command 220 via communication device 106. Processor 102 may determine that third command 220 indicates a third operation is to be performed at electronic device 100. Processor 102 may determine a third set of processing resources of the plurality of processing resources to carry out the third operation. The third set of processing resources may be different than the first set of processing resources and the second set of processing resources. For example, the third operation may be an operation for processor 102 to transmit a heartbeat message to electronic device 104. Processor 102 may transmit the heartbeat message via communication device 106. Thus, processor 102 may maintain electronic device 100 in the power saving state by keeping the plurality of processing resources inactive.

In some examples, electronic device 104 may broadcast a fourth command 222 and processor 102 may receive fourth command 222 via communication device 106. Processor 102 may determine that fourth command 222 indicates a fourth operation is to be performed at electronic device 100. Processor 102 may determine a fourth set of processing resources of the plurality of processing resources to carry out the fourth operation. The fourth set of processing resources may be different than the first set of processing resources, the second set of processing resources, and the third set of processing resources. For example, the fourth operation may be an operation to request input from a user of electronic device 100. Processor 102 may transition electronic device 100 from the power saving state to a full wake state by transitioning processor 202, BIOS, 204, storage device 206, operating system 208, display device 210, communication device 212, and I/O device 214 from inactive to active.

In some examples, in response to receiving a command from electronic device 104, processor 102 may determine a particular set of processing resources to carry out the command. The particular set of processing resources may include a first subset of processing resources to carry out the command and a second subset of processing resources to authenticate the command. As described in more detail in FIG. 3, processor 102 may use a lookup table to determine processing resources needed to carry out a command and a security state associated with the command. Based on the security state, processor 102 may determine processing resource(s) needed to authenticate the command.

In some examples, electronic device 100 may transition from the full wake state to the low power saving state or a partial wake state in response to a command (not shown in the FIGS.) from electronic device 104. The command may indicate an operation to be performed, a power state change, or a combination thereof.

As used herein, processor 102 may be a semiconductor-based microprocessor, a chipset, a field-programmable gate array (FPGA), an application-specific integrated circuit (ASIC), and/or other hardware devices suitable for retrieval and execution of instructions stored in a computer-readable storage medium. Processor 202 may be a central processing unit (CPU), a semiconductor-based microprocessor, a field-programmable gate array (FPGA), an application-specific integrated circuit (ASIC) and/or other hardware devices suitable for retrieval and execution of instructions stored in a computer-readable storage medium.

Communication device 106 may be a transceiver. In some examples, communication device 106 may implement a low energy communication protocol, such as the Bluetooth Low Energy protocol. Thus, electronic device 104 may broadcast first command 216, second command 218, third command 220, or fourth command 222 as a low energy radio signal so that communication device 106 may receive the respective command. Communication device 212 may also be a transceiver. In some examples, communication device 212 may implement a communication protocol that is different from the communication protocol implemented by communication device 106 such that communication device 212 may have a longer transmission range. For example, communication device 212 may implement the Wi-Fi protocol.

Operating system 208 may be a set of instructions that control operations of electronic device 100 when executed by processor 202. As an example, operating system 208 may be a Windows operating system. As another example, operating system 208 may be a Linux distribution operating system.

BIOS 204 may be hardware or hardware and instructions to initialize, control, or operate a computing device prior to execution of operating system 208. Instructions included within BIOS 204 may be software, firmware, microcode, or other programming that defines or controls functionality or operation of BIOS 204. In one example, BIOS 204 may be implemented using instructions, such as platform firmware of a computing device, executable by processor 202. BIOS 204 may operate or execute prior to the execution of operating system 208. BIOS 204 may initialize, control, or operate components such as hardware components of electronic device 100 and may load or boot operating system 208.

In some examples, BIOS 204 may provide or establish an interface between hardware devices or platform firmware of electronic device 100 and operating system 208, via which operating system 208 may control or operate hardware devices or platform firmware of electronic device 100. In some examples, BIOS 204 may implement the Unified Extensible Firmware Interface (UEFI) specification or another specification or standard for initializing, controlling, or operating a computing device, such as electronic device 100.

Storage device 206 may be Random Access Memory (RAM), an Electrically Erasable Programmable Read-Only Memory (EEPROM), a solid-state drive, a hard-disc drive, etc. Display device 210 may include a display panel and circuitry to control operations of the display panel. The display panel may be implemented as a liquid crystal display (LCD) panel, a light-emitting diode (LED) panel, an organic light-emitting diode (OLED) panel, a flexible display panel/film, etc.

I/O device 214 may be any circuitry or device that receives an input (e.g., from a user of electronic device 100) and/or provides an output (e.g., to the user) for electronic device 100. In some examples, I/O device 214 may be implemented as a keyboard, a touchscreen, a biometric sensor (e.g., a fingerprint sensor, a retina sensor, a heartbeat sensor, etc.), a speaker, a microphone, a camera, an imaging device, etc.

Figure 3:
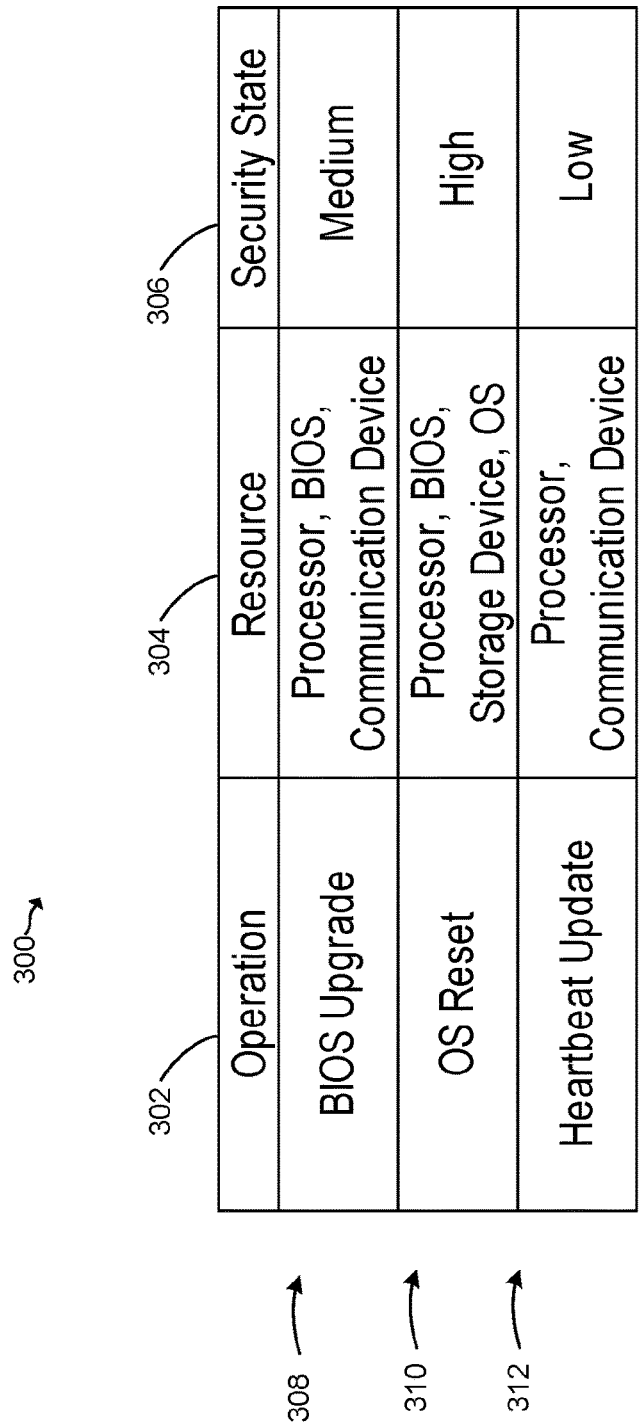
FIG. 3 illustrates a lookup table that indicates a corresponding power state based on a command, according to an example.

FIG. 3 illustrates a lookup table 300 that indicates a corresponding power state based on a command, according to an example. Table 300 may be described with reference to electronic device 100. Table 300 may include an operation column 302, a resource column 304, and a security state column 306. Operation column 302 may identify an operation that is to be performed at electronic device 100. Resource column 304 may indicate resource(s) needed to perform or carry out the operation. Security state column 306 may indicate a level of security measure associated with the operation.

As an example, a row 308 of lookup table 300 may indicate that the operation of first command 216 is a BIOS upgrade operation under operation column 302, the processing resources needed to carry out the operation are processor 202, BIOS 204, and communication device 212 under resource column 304, and the security state is medium under security state column 306. Since the security state is medium, processor 102 may determine that first command 216 is to be authenticated before the operation is performed. Processor 102 may determine that BIOS 204 is also the processing resource needed to authenticate first command 216. Processor 102 may instruct BIOS 204 to perform a handshake with a server that provides the upgrade packet before performing the upgrade operation.

As another example, a row 310 of lookup table 300 may indicate that the operation of second command 218 is an operating system reset operation under operation column 302, the processing resources needed are processor 202, storage device 206, operating system 208, and BIOS 204 under resource column 304, and the security state is medium under security state column 306. Since the security state is high, processor 102 may determine that second command 218 is to be authenticated before the operation is performed. Processor 102 may determine that I/O device 214 may be the processing resource to authenticate second command 218. Processor 102 may transition V/O device 214 from inactive to active to authenticate second command 218. I/O device 214 may be implemented as a fingerprint sensor. Processor 102 may authenticate second command 218 using a user's fingerprint via I/O device 214.

As another example, a row 312 of lookup table 300 may indicate that the operation of third command 220 is a heartbeat update operation under operation column 302, the processing resources needed are processor 102 and communication device 106 under resource column 304, and the security state is low under security state column 306. Since the security state is low, processor 102 may determine that third command 220 may be performed without authentication.

Figure 4:
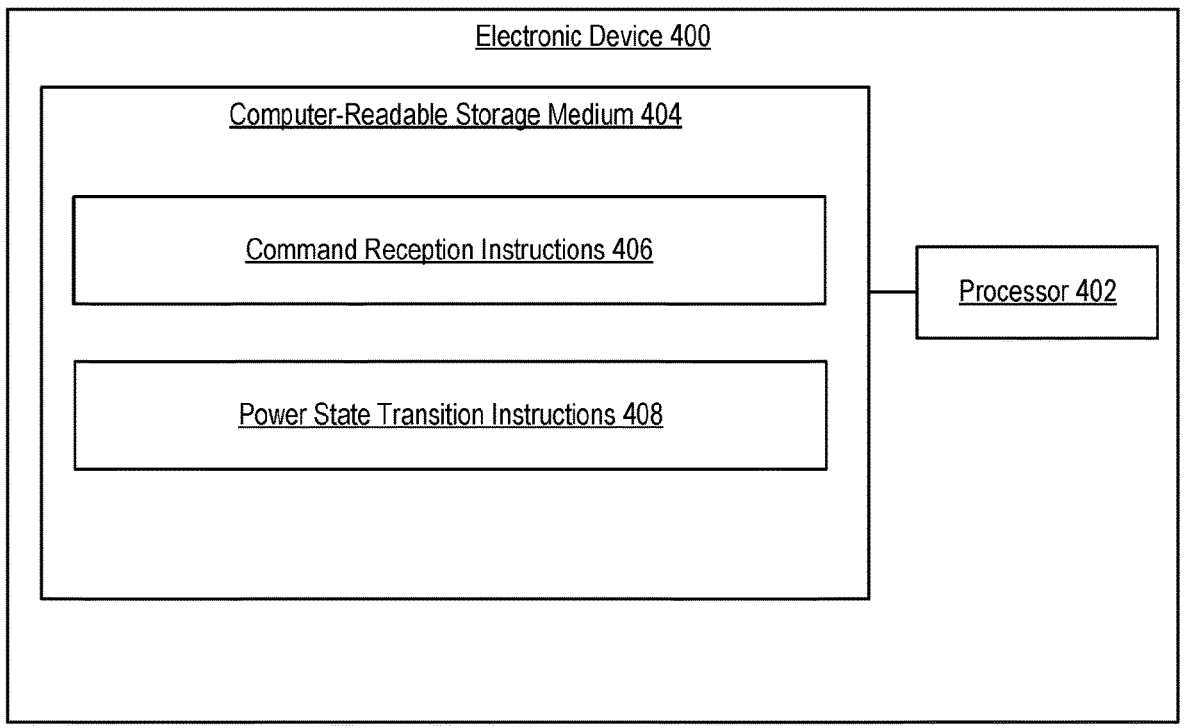
FIG. 4 illustrates an electronic device to transition from a power saving state to a partial wake state based on a command, according to another example.

FIG. 4 illustrates an electronic device 400 to transition from a power saving state to a partial wake state based on a command, according to another example. Electronic device 400 may implement electronic device 100 of FIGS. 1-2. Electronic device 400 may include a processor 402 and a computer-readable storage medium 404. Processor 402 may be similar to processor 102. Computer-readable storage medium 404 may be, for example, Random Access Memory (RAM), an Electrically Erasable Programmable Read-Only Memory (EEPROM), a storage device, an optical disc, etc. In some examples, computer-readable storage medium 404 may be a non-transitory storage medium, where the term "non-transitory" does not encompass transitory propagating signals. Computer-readable storage medium 404 may be encoded with a series of processor executable instructions 406 and 408.

Command reception instructions 406 may receive a command from another electronic device. For example, referring to FIG. 1, processor 102 may receive command 108 from electronic device 104. Power state transition instructions 408 may transition electronic device 400 from one power state to another power state. For example, referring to FIG. 2, processor 102 may transition electronic device 100 from the power saving state to a partial wake state or a full wake state based on the command received (e.g., first command 216, second command 218, etc.).

The use of "comprising", "including" or "having" are synonymous and variations thereof herein are meant to be inclusive or open-ended and do not exclude additional unrecited elements or method steps.

What is claimed is:

1. An electronic device comprising:
   a communication device to receive a command from another electronic device while the electronic device is in a power saving state, wherein the command is different from a wake command;
   a basic input/output system (BIOS); and
   a processor to transition the electronic device from the power saving state to:
   a partial wake state when the command indicates a first operation; and
   a full wake state when the command indicates a second operation,
   wherein the processor is to transition the BIOS from inactive to active in the partial wake state and wherein the first operation is a BIOS update operation.

2. The electronic device of claim 1, wherein the communication device is to receive the command via a low energy radio signal.

3. The electronic device of claim 1, wherein the processor is to keep the electronic device in the power saving state when the command indicates a third operation.

4. The electronic device of claim 1, further comprising an input/output (I/O) device, wherein the processor is to transition the BIOS and the I/O device from inactive to active in the partial wake state.

5. The electronic device of claim 4, further comprising an operating system (OS), wherein the processor is to transition the operating system, the BIOS, and the I/O device from inactive to active in the full wake state.

6. The electronic device of claim 5, wherein the second operation is an OS erase operation.

7. An electronic device comprising:
   a plurality of processing resources;
   a communication device to receive a command from another electronic device while the plurality of processing resources is inactive, wherein the command is different from a wake command; and
   a processor to:
   transition a first set of the plurality of processing resources from inactive to active and the electronic device from a power saving state to a partial wake state when the command indicates a first operation, wherein the first set of the plurality of processing resources comprises a basic input/output system (BIOS) and an input/output (I/O) device; and
   transition a second set of the plurality of processing resources from inactive to active and the electronic device from the power saving state to a full wake state when the command indicates a second operation, wherein the second set of the plurality of processing resources comprises the BIOS, the I/O device, and an operating system (OS).

8. The electronic device of claim 7, wherein the plurality of processing resources includes the BIOS, the OS, and a central processing unit (CPU).

9. The electronic device of claim 7, wherein the processor is to:
   transition the first set from active to inactive when the first operation is completed; and
   transition the second set from active to inactive when the second operation is completed.

10. A non-transitory computer-readable storage medium comprising instructions that when executed cause a processor of an electronic device to:
    receive a command from another electronic device, wherein the command is different from a wake command; and
    transition a set of processing resources of the electronic device from inactive to active and the electronic device from a power saving state to a partial wake state when the command indicates a first operation, or
    transition the electronic device from the power saving state to a full wake state when the command indicates a second operation,
    wherein the set of processing resources comprises a basic input/output system (BIOS) and wherein the first operation is a BIOS operation.

11. The non-transitory computer-readable storage medium of claim 10, wherein the set of processing resources includes a first subset of processing resources to carry out the command and a second subset of processing resources to authenticate the command, and wherein the second subset of processing resources includes a biometric sensor, an imaging device, an input/output device, or a combination thereof.

12. The non-transitory computer-readable storage medium of claim 10, wherein the set of processing resources includes a first subset of processing resources to carry out the command and a second subset of processing resources to authenticate the command, and wherein the first subset of processing resources includes the BIOS, an operating system (OS), or a combination thereof.

13. The non-transitory computer-readable storage medium of claim 10, wherein the instructions when executed further cause the processor to receive the command via a low energy communication protocol.

* * * * *